(12) United States Patent
Zheng et al.

(10) Patent No.: US 9,515,558 B2
(45) Date of Patent: Dec. 6, 2016

(54) SWITCH-MODE POWER SUPPLY WITH TEMPERATURE AND CURRENT SHARING

(71) Applicant: BEL FUSE (MACAO COMMERCIAL OFFSHORE) LIMITED, Andar H-K (MO)

(72) Inventors: Yanli Zheng, Zhejiang (CN); Zhao Tang, Zhejiang (CN); Yuanping Zhou, Zhejiang (CN); Hongliang Lu, Zhejiang (CN)

(73) Assignee: Bel Fuse (Macao Commercial Offshore) Limited, Andar H-K (MO)

( * ) Notice: Subject to any disclaimer, the term of this patent is extended or adjusted under 35 U.S.C. 154(b) by 158 days.

(21) Appl. No.: 14/256,158

(22) Filed: Apr. 18, 2014

(65) Prior Publication Data

US 2014/0312857 A1    Oct. 23, 2014

Related U.S. Application Data

(60) Provisional application No. 61/813,245, filed on Apr. 18, 2013.

(51) Int. Cl.
*H02M 3/158* (2006.01)
*H02J 3/46* (2006.01)
*H02M 3/156* (2006.01)
*H02M 1/00* (2006.01)
*H02M 1/32* (2007.01)

(52) U.S. Cl.
CPC .............. *H02M 3/1584* (2013.01); *H02J 3/46* (2013.01); *H02M 1/32* (2013.01); *H02M 3/156* (2013.01); *H02M 2001/0009* (2013.01); *H02M 2001/327* (2013.01)

(58) Field of Classification Search
CPC .... H02M 3/158; H02M 3/156; H02M 3/155; H02M 3/157; H02M 3/1588; H02M 3/1584

USPC ................ 323/222, 271, 282–286
See application file for complete search history.

(56) References Cited

U.S. PATENT DOCUMENTS

| | | | | |
|---|---|---|---|---|
| 6,163,143 | A | * 12/2000 | Shimamori | ........... H02M 3/157 323/284 |
| 2002/0044458 | A1 | 4/2002 | Elbanhawy | |
| 2013/0057239 | A1 | 3/2013 | Kalje et al. | |

FOREIGN PATENT DOCUMENTS

| | | |
|---|---|---|
| EP | 0435460 A2 | 11/1991 |
| WO | 2009010476 A1 | 1/2009 |

OTHER PUBLICATIONS

European Search Report, European Patent Office, Application No. 14165154.7, Applicant Bel Fuse (Macao Commercial Offshore) Ltd. 9 pages.

*Primary Examiner* — Timothy J Dole
*Assistant Examiner* — Bryan R Perez
(74) *Attorney, Agent, or Firm* — BainwoodHuang (57) ABSTRACT

A switched-mode power supply in a set of parallel-connected switched-mode power supplies is operated to (1) monitor both output current and operating temperature, and (2) auto-tune an output voltage using two-dimensional control that employs a two-dimensional function of the output current and the operating temperature. The two-dimensional function is a sharing function whose use in each of the supplies effects a coordinated sharing of both load current and operating temperature across the set of supplies. Temperature sharing includes monitoring and controlling distribution of operating temperatures across the set of supplies to reduce undesirable temperature imbalance that can cause excessive thermal stress and reduce reliability.

20 Claims, 7 Drawing Sheets

SWITCH-MODE POWER SUPPLY WITH TEMPERATURE AND CURRENT SHARING

SUMMARY

Parallel-connected switch-mode power supplies (SMPSs) provide a good solution for high-power applications. Because of the high density of modern SMPSs, a set of parallel SMPS has relatively small volume and light weight. In a parallel system, every SMPS module may source only a fraction of overall load current, reducing load-related stress and in some cases providing redundancy for higher availability. When an individual module fails, the system still can reach 100% load. The configuration may also be used to provide uninterrupted power, because of the ability to hot-swap a failed module. Also, it is relatively easy to meet different power requirements with low design cost. So, the parallel SMPS system is one kind of high power SMPS solution with high practicability, high efficiency, high reliability, easy manufacture, low cost, etc.

However, the SMPS modules in a parallel arrangement may have different power characteristics, which can lead to current imbalance among the parallel modules. A module with a higher output voltage experiences higher output current, perhaps even above its rating, which leads to thermal stress and current stress, so the module has less reliability and a shorter lifetime. A module having a lower output voltage provides lower current and may even sink current, which may lead to sink current stress, so the module may have less reliability and a shorter lifetime.

For SMPS modules in parallel, there are known ways to share current. The aim of sharing current is to improve the reliability of a parallel SMPS system, and to reduce or manage the thermal stress caused by high current. Known current-sharing techniques include the so-called droop method, automatic master-slave structure, automatic average current sharing scheme, and forced control method, among others.

Although known current sharing techniques may be effective at achieving accurate current sharing among a set of parallel modules and thereby reduce the effects of current stress, there can be effects in the physical environment that contribute to thermal imbalance among the modules and therefore to reliability and performance issues. Differences in the physical environment such as different cooling conditions, different parallel arrangements, different heat sinks and different radiating patterns may cause significant temperature differences among the modules even when their respective currents are equalized, leading to thermal stress imbalance and reducing system reliability.

As one simple example, two parallel SMPSs may be physically arranged by stacking them vertically. Generally, the upper module has better heat dissipation than the lower one. And the upper module can more easily use a large heat sink to improve heat dissipation. The lower module has poor heat dissipation and thus worse thermal conditions. In other arrangements there may be differences in the effects of forced-air cooling. One module may have a high air flow rate while a second module has much lower or even no cooling air flow. The temperature rising rate of the first module is lower than that of the second, so the second module has higher thermal stress and lower reliability.

In order to address the thermal stress imbalance which can be caused by current imbalance and other factors in a parallel SMPS system, disclosed are power supply modules and systems in which both module temperatures and currents are used to auto-tune module operation to achieve better thermal balance among the modules.

A method of operating a switched-mode power supply in a set of parallel-connected switched-mode power supplies is disclosed, where the set of parallel-connected switched-mode power supplies have respective outputs connected together to provide power to a load. Both output current and operating temperature of the switched-mode power supply are monitored, and an output voltage of the switched-mode power supply is auto-tuned using two-dimensional control. The two-dimensional control employs a predetermined two-dimensional function of the output current and the operating temperature to vary a duty cycle of operation of the switched-mode power supply to achieve the auto-tuning of the output voltage. The two-dimensional function is a sharing function whose use in each of the set of parallel-connected switched-mode power supplies causes a coordinated sharing of both the load current and the operating temperature across the set of parallel-connected switched-mode power supplies. As used herein, "sharing" operating temperature refers to obtaining a desired distribution of operating temperatures across the set of supplies, by explicit monitoring and control. In one simple example, the temperatures may be equalized so that each supply is operated at exactly the same temperature. Other distributions are possible and may be desired based on a variety of factors, some of which are described herein. By incorporating temperature sharing along with current sharing, thermal imbalance among the supplies may be reduced to minimize excessive stress at any given supply, improving operation as well as longer-term reliability.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIGS. 10(a) through 14 are schematic diagrams of power supply modules;

DETAILED DESCRIPTION

Figure 1A:
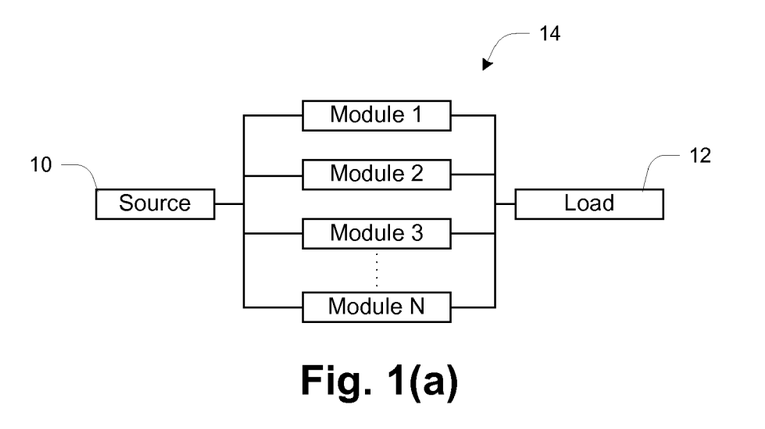
FIG. 1(a) a schematic block diagram of a first parallel switch-mode power supply (SMPS) system having a single source and single load.
Figure 1B:
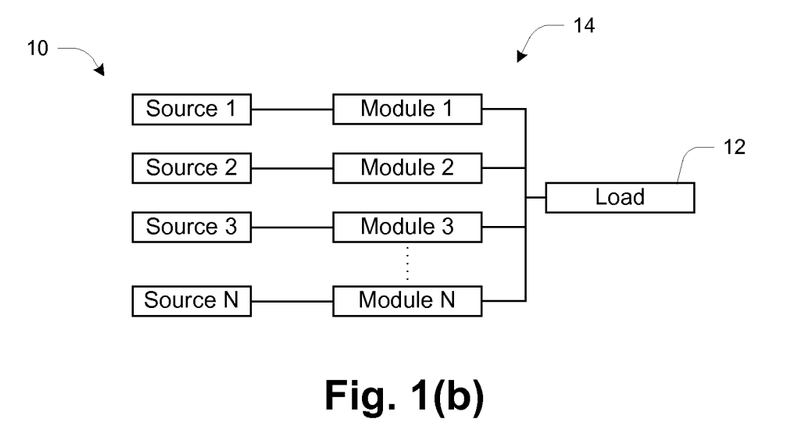
FIG. 1(b) a schematic block diagram of a second parallel SMPS system having multiple sources and a single load.

FIGS. 1(a) and 1(b) show two parallel arrangements for an SMPS system. FIG. 1(a) shows a first arrangement having a single source 10, single load 12, and a parallel arrangement of SMPS modules 14. FIG. 1(b) shows a second arrangement having multiple sources 10, a single load 12, and a parallel arrangement of SMPS modules 14, with each module 14 receiving input power from a respective source 10. Other arrangements are of course possible.

As mentioned above, parallel-connected power supplies such as those of FIGS. 1(a) and 1(b) provide a good solution for many applications. However, there are the problems of different power characteristics, mechanical/thermal designs, and operating environments of individual modules that lead to undesirable current and temperature imbalances as described above.

Figure 2A:
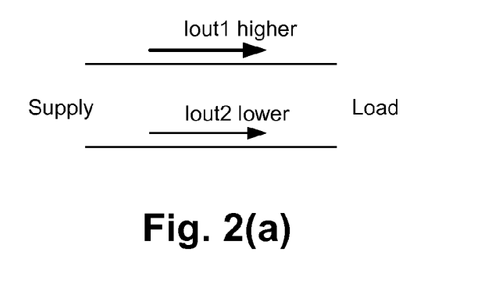
FIGS. 2(a) and 2(b) are schematic depictions of output current of two parallel modules.
Figure 2B:
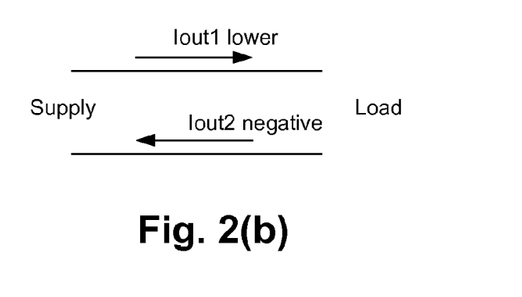

FIGS. 2(a) and 2(b) illustrate current imbalance. In FIG. 2(a) one module 14 (not shown) supplies an output current Iout1 having a higher value that an output current Iout2 supplied by another module 14 (not shown). FIG. 2(b) shows a situation in which Iout1 is lower than in FIG. 2(a) and Iout2 is actually negative, meaning that the power supply is sinking current rather than sourcing (supplying) it to the load 12. These are both undesirable operating conditions.

Figure 3:
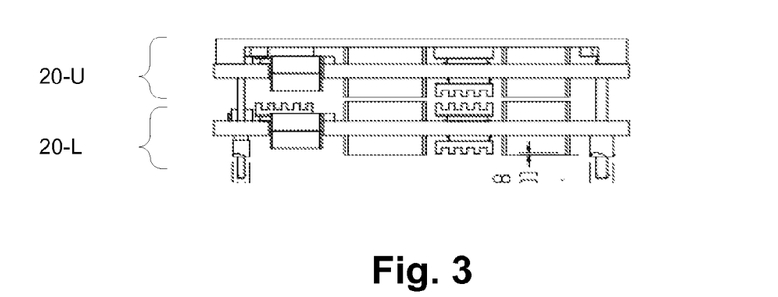
FIG. 3 is a quasi-mechanical drawing showing two parallel modules arranged in a vertical stack.

FIG. 3 illustrates one physical arrangement that can produce temperature imbalance. A first module 20-U is stacked on top of a second module 20-L. Because heat rises, when the power supply is operating in the upright orientation of FIG. 3, the upper module 20-U has better heat dissipation than the lower module 20-L. Also, if a typical surface-attached heat sink is used (e.g., by attachment to the top of the upper module 20-U), it will provide a greater heat dissipation improvement for the upper module 20-U over the lower module 20-L. In conventional current-sharing power supply systems, such temperature imbalances are not accounted for, and thus some modules may experience higher thermal stress and lower reliability.

Figure 4:
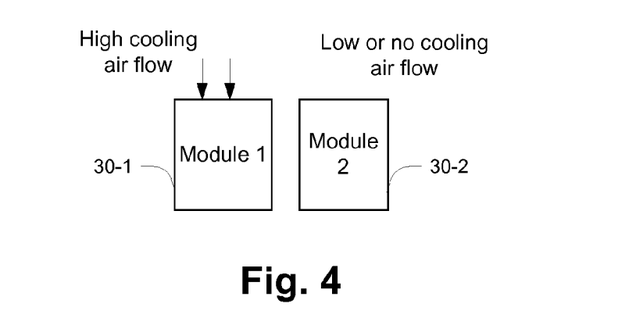
FIG. 4 is a schematic depiction of different cooling conditions for two parallel SMPS modules.

FIG. 4 illustrates another aspect of the physical environment leading to temperature imbalance, namely that two parallel power supply modules 30 have different cooling conditions. A first module 30-1 receives high cooling air flow (e.g., from a cooling fan), while a second module 30-2 has low or even no cooling air flow. The temperature rising rate of module 30-1 is lower than for module 30-2, so module 30-2 has higher thermal stress and lower reliability.

To address the thermal stress imbalance which is caused by current imbalance as well as temperature imbalance in parallel SMPS systems, the present disclosure describes techniques of auto-tuning module operation based on either or both temperature and current. Temperature imbalance can be more directly addressed, so that improved system operation and reliability are achieved.

Figure 5:
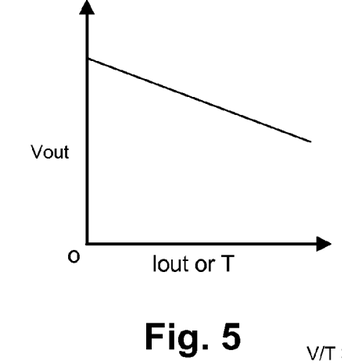
FIGS. 5 through 9 are graphs of various power supply operating characteristics for output voltage versus one or both of current and temperature.

FIG. 5 illustrates a linear characteristic of output voltage versus either output current Iout or temperature T alone. This characteristic can be used for two distinct modes of operation—current sharing only, and temperature sharing only.

For current sharing only, the parallel modules 14 share current by using the characteristic of FIG. 5 at each module, i.e., reducing the output voltage with increasing output current value. Generally, the SMPS output characteristic is $U_{out}=f(I_{out})$. In the particular example of FIG. 5, a linear relation is used in which $f=-k_I$ where $k_I$ is a positive constant. Output voltage decreases with increasing current.

For temperature sharing, it is first observed that power supply modules 14 generally have the feature that their power dissipation and operating temperature increase with increasing load current. For different power densities and components, the temperature and output current have different relations such as a linear or a nonlinear relation, but generally the temperature of a module 14 increases as current increases. Thus, for managing temperature balance of the parallel modules 14, the output voltage of higher-temperature modules 14 in the system is reduced, so that the current of such modules is also reduced and the temperature is brought down to a desired value. The general SMPS output characteristic is $U_{out}=f(T)$. Referring again to FIG. 5, a linear relation is used in which $f=-k_T$, where $k_T$ is a positive constant. Output voltage decreases with increasing temperature.

Both Temperature Sharing and Current Sharing

For a set of parallel SMPSs having thermal stress issues due to both current imbalance and temperature imbalance caused by other factors (i.e., other than current imbalance), the SMPSs may employ both current sharing and temperature sharing functions for improved reliability of the SMPS. So the SMPS output characteristic is $U_{out}=f(T,Iout)$. The function $f$ includes (implicitly or explicitly) relative weights between T and $I_{out}$. These weights may be static and supplied either at a time of manufacturing/deployment or perhaps during an update, reconfiguration, or analogous operation. In some embodiments, these weights may be adjusted dynamically during operation to achieve a desired balance. Thus for example, if all the parallel SMPSs have a similar temperature, the weight of $I_{out}$ in $U_{out}$ may be increased; if the parallel SMPSs have different temperatures caused by differences in the external environment and/or their own thermal design, the weight of T in $U_{out}$ may be increased at higher temperatures and the proportion of $I_{out}$ in $U_{out}$ increased at lower temperatures. Specific examples are described below.

FIGS. 6 through 9 are used to illustrate examples of two-dimensional sharing—current and temperature. These Figures show output voltage Vout (vertical axis) as a function of both output current Iout (horizontal axis) and temperature (axis into page, orthogonal to both Vout and Iout axes).

Figure 6:
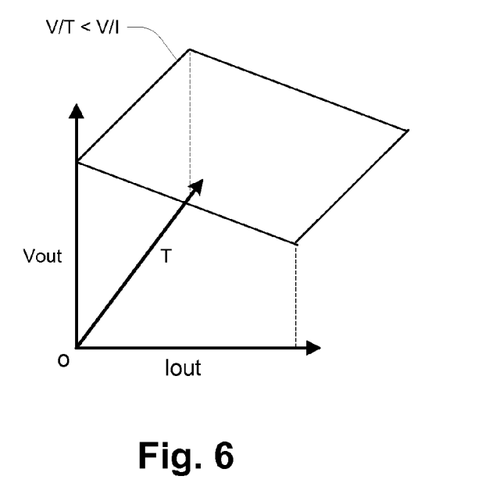

Operation of SMPSs having both temperature sharing and current sharing may be divided into the following two conditions:

(1) Current sharing requirement is stronger than temperature sharing requirement As shown in FIG. 6, output Vout voltage is reduced as either the output current Iout or operating temperature T increases. In this case the relative weight of output current in setting the output voltage is greater than the weight for temperature. The different weights are reflected in the variation of output voltage across the respective dimension, i.e., the change in output voltage across the entire range of output current is higher than the change in output voltage across the entire range of operating temperature. In a case of linear relationships for temperature versus output voltage and current versus output voltage, the slope of the current line is higher than the slope of the temperature line. This is observable in FIG. 6 especially in comparison to FIG. 7.

Figure 7:
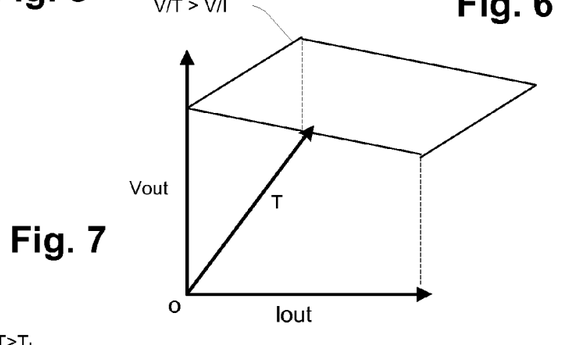

(2) Temperature sharing requirement is stronger than current sharing requirement As shown in FIG. 7, output voltage is reduced as current and temperature increase, and the relative weight of temperature in setting the output voltage is higher than the weight for output current. Again assuming linear relationships, the slope of the temperature line is higher than the slope of the current line. This is observable in FIG. 7 especially in comparison to FIG. 6.

Because temperature sharing is especially important at higher temperatures, it may be desirable to reduce or even remove it at lower temperatures, even if the temperature sharing requirement is stronger or equal to the current sharing requirement. This can improve the accuracy of current sharing at lower temperatures. Temperature sharing is included at higher temperatures. Thus at lower temperatures, temperature differences have no effect on output voltage, and at higher temperatures, the output voltage is reduced with increasing temperature. At lower temperatures, changing module temperature has little effect on output voltage, while changing current can have significant effect on output voltage. At higher temperatures, temperature has greater effect on output voltage, and current has relatively little effect on output voltage.

Figure 8:
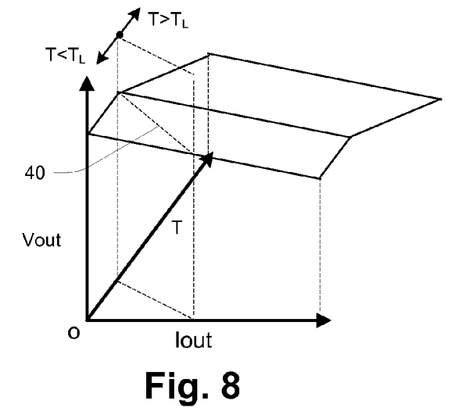

FIG. 8 shows an example in which temperature sharing is removed below a threshold temperature $T_L$. In this region, the T-dimension slope is zero, so that throughout this region the only effect is current sharing. Above the threshold $T_L$, temperature sharing also occurs, as illustrated by the linear negative slope in the T dimension. The dotted line 40 indicates where the $T=T_L$ plane intersects the output characteristic.

Figure 9:
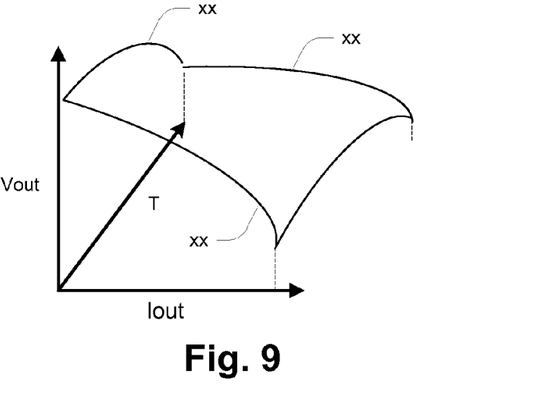

FIG. 9 illustrates another aspect of operation discussed above. At lower temperature, temperature change has little effect on output voltage (small/gradual slope in T dimension), while current has a greater effect on output voltage (higher/steeper slope in Iout dimension). At higher temperature, temperature has a greater effect on output voltage (higher/steeper slope in T dimension) and current has relatively less effect on output voltage (small/gradual slope in Iout dimension).

Implementations

There are a variety of ways of implementing circuitry to realize the two-dimensional control described herein. Specific examples are given below.

1. Droop Method

Figure 10A:
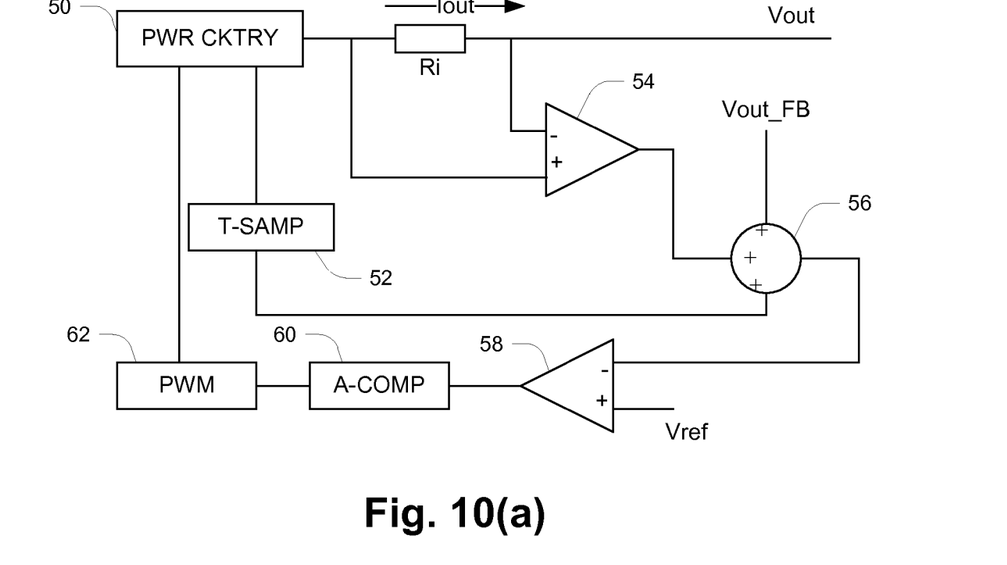
Figure 10B:
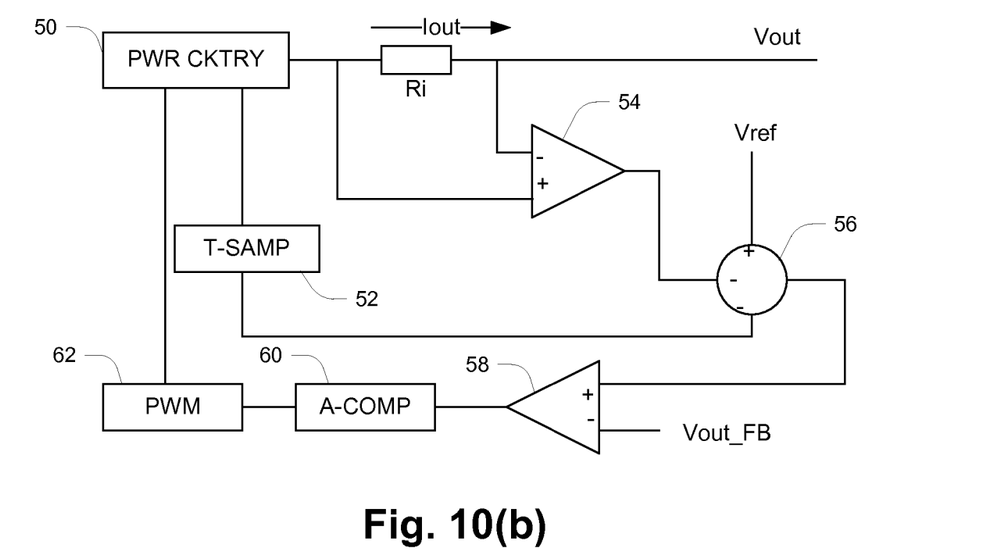

FIGS. 10(a) and 10(b) illustrate two variations of the so-called "droop" method of providing an output characteristic having a negative linear slope, such as shown in FIGS. 6 and 7 for example. This is an output impedance method, and is also known as a voltage adjustment rate method. It is one kind of temperature sharing and current sharing method by changing the external characteristic slope of output voltage. These circuits use analog compensation in the feedback control loop.

Main power circuitry (PWR CKTRY) 50 generates the output current Iout and output voltage Vout through a current sensing resistor Ri. Respective outputs from a temperature sampler (T-SAMP) 52 and a current-sense amplifier 54 are provided to combination circuitry 56 along with an output voltage feedback signal Vout_FB. The output from combination circuitry 56 is provided to a comparator 58 along with a reference voltage Vref, and the output of the comparator 58 passes through analog compensation circuitry (A-COMP) 60 to pulse-width modulation (PWM) circuit 62 which controls the duty cycle of operation of the power circuitry 50 to regulate the level of the output voltage Vout.

In particular in FIG. 10(a), the output voltage feedback signal Vout_FB is tuned to regulate output voltage. Resistor Ri and temperature sampler 52 serve as monitoring circuitry, and the other components serve as control circuitry that controls the duty cycle of the power circuitry 50.

FIG. 10(b) shows a circuit almost identical to the circuit of FIG. 10(a), except that the reference voltage signal Vref is tuned to regulate output voltage.

Figure 11:
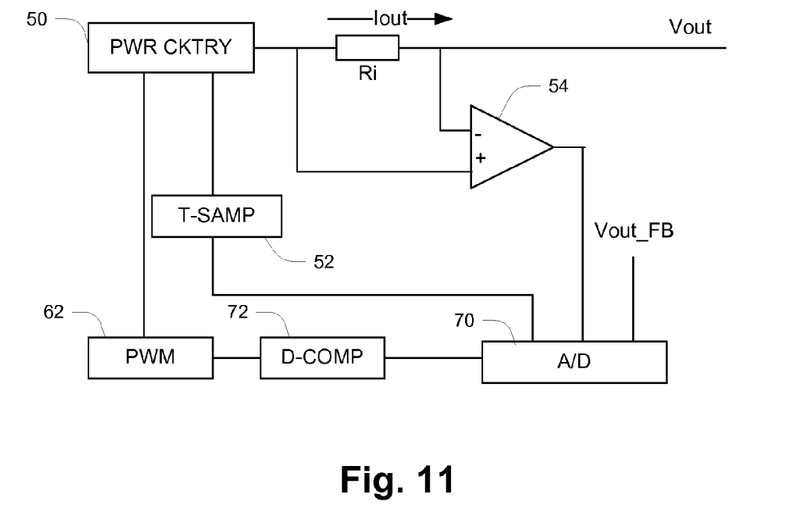

FIG. 11 shows a circuit similar to the circuit of FIG. 10(a) except that it employs a digital compensated feedback loop. It includes analog-to-digital converter (A/D) 70 and digital compensation circuitry (D-COMP) 72. In this circuit, through sampling output voltage, output current and temperature of the SMPS, the function $U_{out}=f(T, Iout)$ is implemented in part by a digital algorithm executing in a controller or similar circuit that realizes the digital compensator 72.

Generally during operation of the circuits of FIGS. 10(a), 10(b) and 11, when the temperature remains unchanged, the output of PWM 62 is reduced with increasing output current. When PWM is reduced, output voltage drops. The external characteristic of the high current SMPS slopes down, and gets close to the external characteristics of the other SMPSs. Then the currents of the other SMPSs increase, equalizing the current sharing.

With respect to temperature sharing of SMPSs, the higher the temperature of SMPS is, the smaller the duty cycle as controlled by PWM 62 is. The external characteristic of the high temperature SMPS slopes down, and gets close to the external characteristics of the other SMPSs. Then the currents and temperatures of the other SMPSs increase, equalizing the temperature sharing.

2. Average Value Method

Figure 12:
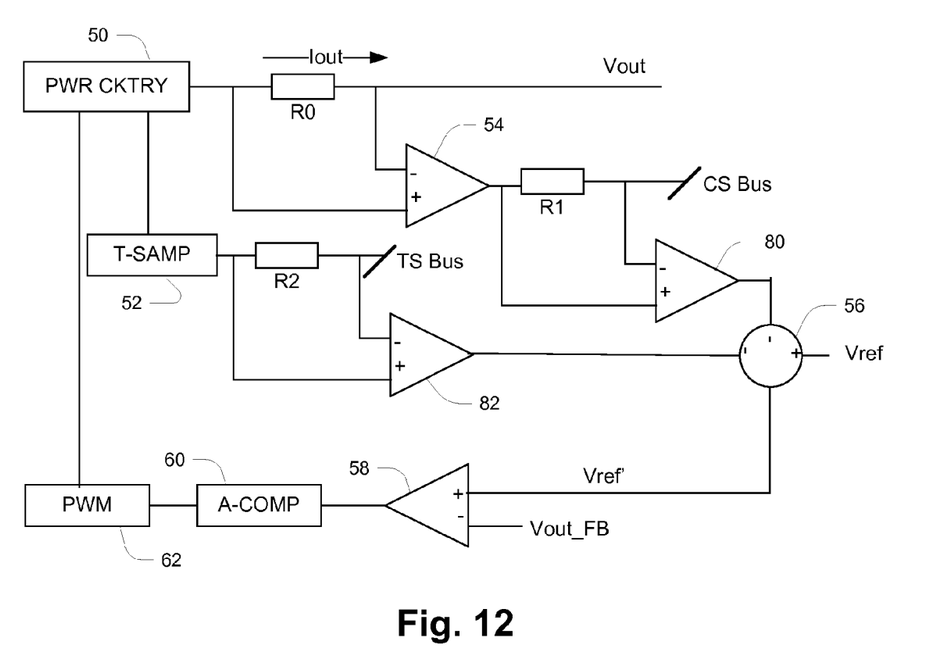
Figure 13:
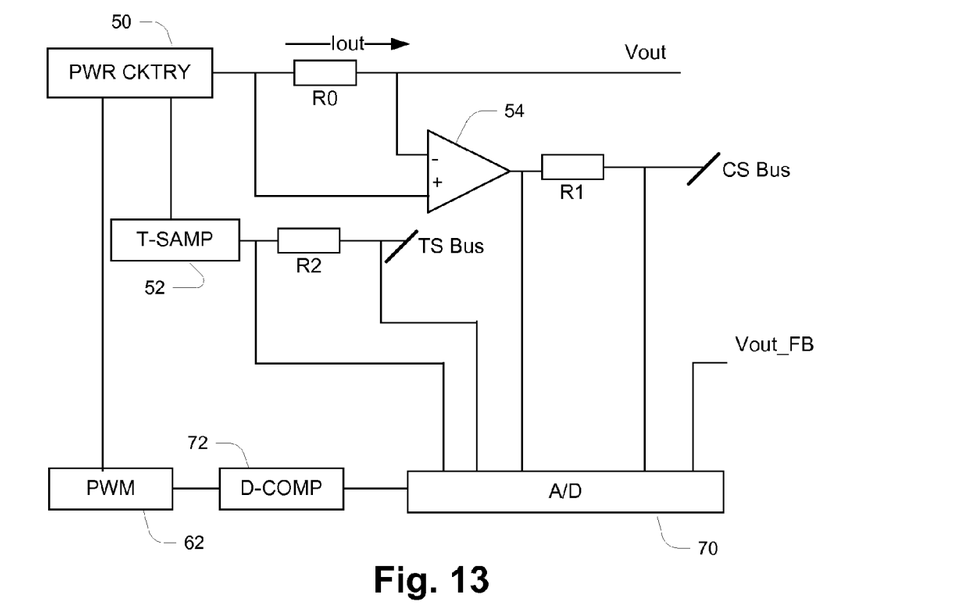

FIGS. 12 and 13 illustrate an average value method used to automatically share temperature and current. These both employ a current-sharing bus (CS Bus) and a temperature-sharing bus (TS Bus) to which each module 14 of a parallel arrangement is connected. Temperature and current are auto-tuned by using average temperature and average current values to achieve temperature sharing and current sharing. Through resistor R1, the output of current amplifier 80 of each parallel SMPS is connected to the CS bus. Through resistor R2, the output of a temperature sampling amplifier 82 of each parallel SMPS is connected to the TS bus. The circuit of FIG. 12 employs an analog compensated loop, and the circuit of FIG. 13 employs a digital compensated loop.

In FIG. 12, the comparator 80 compares the output current value of this module 14 with the value of the CS bus, generating an error value provided to combination circuitry 56. Similarly, the comparator 82 compares the temperature sampling value of this module 14 with the value of TS bus, generating an error value provided to combination circuitry 56. In order to tune the reference voltage, the reference voltage $V_{ref}$ is compared with $I_{error}$ and $T_{error}$ to generate a new reference value $V_{ref}'$. The comparator 58 compares $V_{ref}'$ with the output voltage feedback value Vout_FB, and duty cycle is controlled via the analog compensator 60 and the PWM module 62. Similar to FIG. 10(a), it is possible to alternatively tune the value of the output voltage feedback value Vout_FB in the average value method. In this case, $I_{error}$ is added with $T_{error}$ and the output voltage feedback value Vout_FB, and the result is compared with the reference voltage $V_{ref}$ to control PWM.

FIG. 13 shows a circuit similar to the circuit of FIG. 12 but using digital compensation. Within the digital compensator 72, calculations are performed to obtain $I_{error}$ and $T_{error}$, and the function $U_{out}=f(T,Iout)$ is realized by a digital algorithm in a program executing in a controller or similar circuit to change the reference of the digital compensator 72, whose output controls operation of PWM module 62 and duty cycle of operation.

Using the average value method to automatically share temperature and current, when the SMPS is in current balance, the voltage across R1 is zero, and the SMPS is under sharing current state. Otherwise, the voltage across R1 is not zero, and this voltage is amplified for controlling the error between the reference voltage and the feedback value of output voltage. This activates the whole feedback loop to control the output current, and realize the purpose of current sharing control.

Using the average value method to automatically share temperature and current, when the SMPS is in temperature balance, the voltage across R2 is zero, and the SMPS is under shared temperature state. Otherwise, the voltage of R2 is not zero, and this voltage is amplified for controlling the error between the reference voltage and the feedback value of output voltage. This activates the whole feedback loop to control the output current, and realize the purpose of temperature sharing control. The temperature is changed with changing current, and the purpose of temperature sharing control is realized. Through the temperature sharing bus and the compensation loop, the PWM of the high temperature module 14 is reduced, the output voltage is reduced, the output current is reduced, and the temperature drops.

For the different conditions of sharing temperature and sharing current, there can be two different designs to realize sharing temperature and sharing current by practical application environment.

(1) For the SMPSs with high requirement of sharing current or good consistency of all the SMPSs temperature, increase the effect of current on the SMPS, and decrease the effect of temperature on the SMPS.

(2) For the SMPSs with high requirement of sharing temperature, when at lower temperature, increase the weight of current on the SMPS, and decrease the effect of temperature on the SMPS; when at a higher temperature, increase the weight of temperature on the SMPS, and decrease the weight of current on the SMPS.

3. Maximum Value Method

Figure 14:
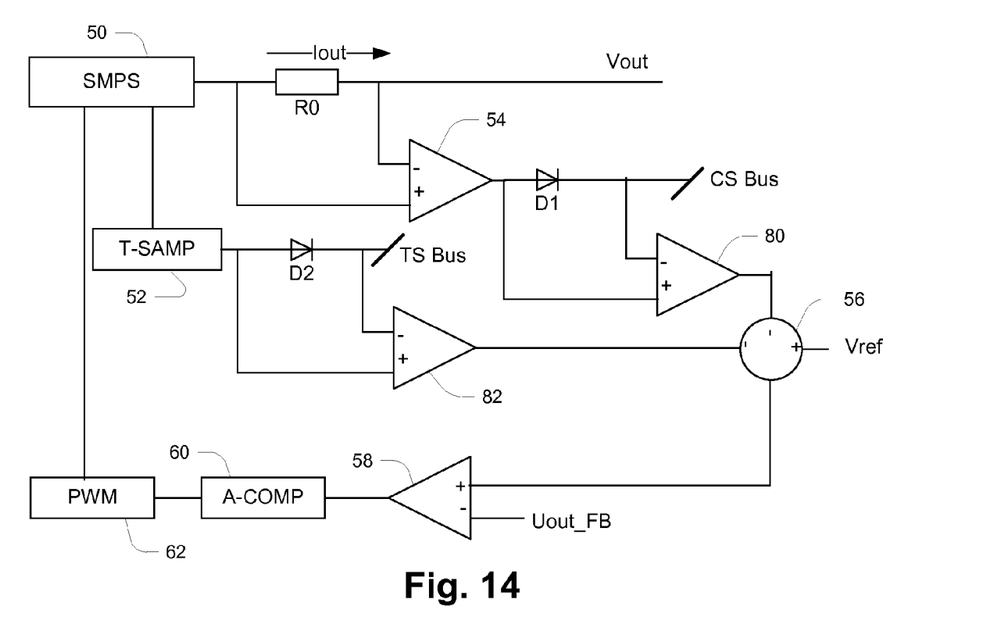

Using a maximum value method to automatically share temperature and current means that temperature and current are auto-tuned by using maximum temperature and maximum current values to achieve temperature sharing and current sharing. This method is similar to the average value method and may be implemented by similar circuitry. Referring to FIG. 14, this circuit is similar to the circuit of FIG. 12 except that the resistors R1 and R2 are replaced by diodes. This forms a master-slave structure. The SMPS with largest current or the largest temperature is a master module establishing the target for current or temperature sharing; other SMPSs are slave modules that respond by increasing their current or temperature accordingly.

In FIG. 14, using diodes D1, D2 having unidirectional conductivity, only the largest current can connect with the current sharing bus and only the highest temperature can connect with the temperature sharing bus. This means that the voltage of the current sharing bus represents the largest current among the parallel SMPSs, and the voltage of temperature sharing bus represents the highest temperature of the parallel SMPSs. By operation of the feedback loop similar to as described above for the circuit of FIG. 12, the SMPS achieves the goal of sharing temperature and current. The circuit of FIG. 14 uses analog compensation circuitry 60 and tuning by changing reference voltage Vref. The maximum method can also be implemented using the variations of changing the output voltage feedback value Vout_FB or digital compensation.

Like the average value method, according to different requirements of sharing temperature and sharing current, the maximum value method changes the proportion of current and temperature in SMPSs to achieve reducing thermal stress of sharing current, sharing temperature or both sharing current and sharing temperature.

4. External Controller Method

Figure 15:
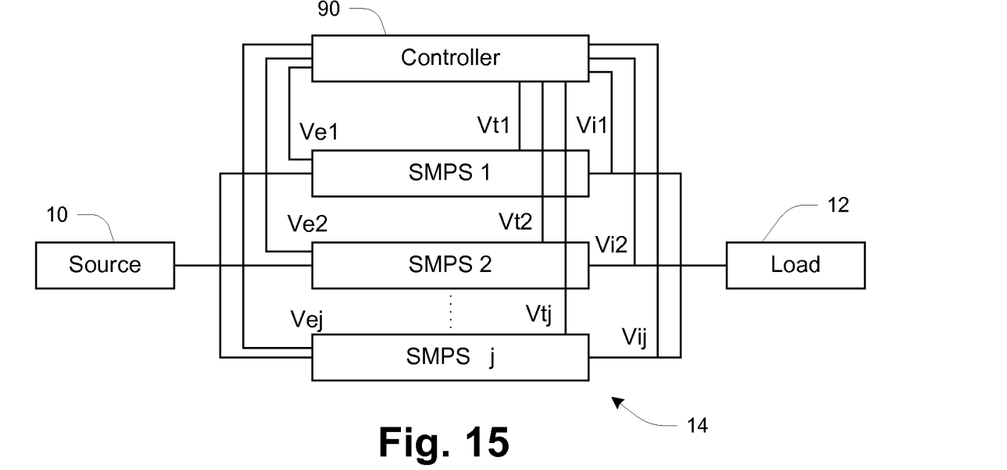
FIG. 15 is a schematic block diagram of a parallel SMPS system using an external control method.

FIG. 15 shows an external controller method in which an external controller 90 is added to share temperature and sharing current. Every SMPS has own current sampling value, translated into voltage Vi; every SMPS has own temperature sampling value, translated into voltage Vt.

Using an analog mode controller, Vi and Vt are compared along with an internal signal of the controller to generate a voltage error signal Ve, and in each SMPS 14 the error signal is added to the SMPS compensator to realize sharing temperature and current among the parallel SMPSs.

Using a digital mode controller, Vi and Vt are sampled, and either the average value, maximum value or another algorithm are used to generate the output PWM or error signal for every SMPS. Within each SMPS 14 the signal is added to the corresponding compensator to realize sharing temperature and current among the parallel SMPSs.

Like the above other methods, according to different requirements of sharing temperature and sharing current, the proportion of current and temperature may be changed in the external controller 90 to achieve reducing thermal stress of sharing current, sharing temperature or both sharing current and sharing temperature.

5. Communication Method

Communication methods involve exchanging current data and temperature data among the parallel SMPSs. There are several communication methods including serial communication (SPI, UART, I2C, etc.) and parallel communication.

Figure 16:
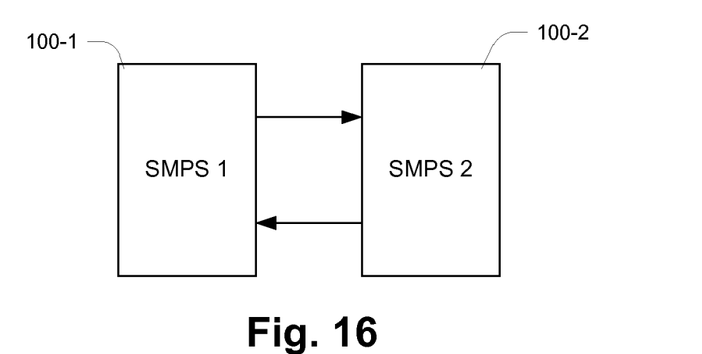
FIG. 16 is a schematic block diagram of a parallel SMPS system using a first communication method.

FIG. 16 shows dual SMPSs as an example. Using these communication methods, current and temperature data are exchanged between the SMPS 100-1 and SMPS 100-2 to realize sharing temperature and sharing current.

Figure 17:
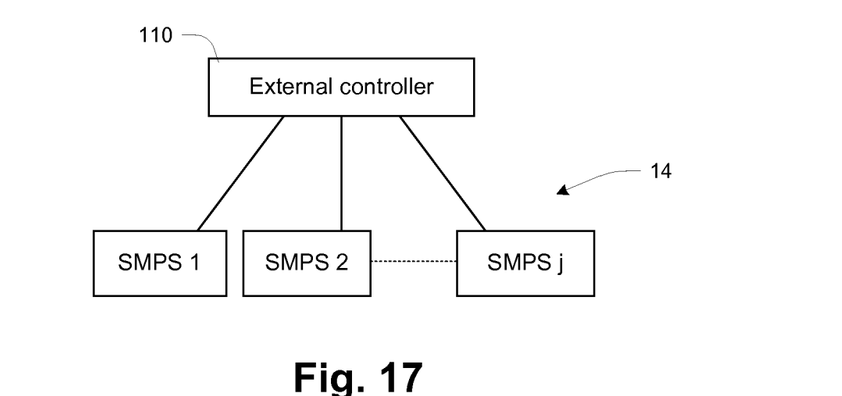
FIG. 17 is a schematic block diagram of a parallel SMPS system using a second communication method.

FIG. 17 shows use of an external controller 110 to use communication method to control parallel SMPSs 14. The external controller 110 is connected with all the SMPSs 14. Every SMPS has different identifier (ID), and as master the controller 110 has its own ID. The external controller 110 identifies each SMPS by its unique ID. Using one of the communication methods, the external controller 110 can communicate with all the parallel SMPSs 14. The external controller 110 receives and processes the temperature data and current data of all the SMPSs 14. Every SMPS 14 receives an individual feedback signal from the external controller 110 to control its respective PWM to regulate the output.

Like the other methods above, according to different requirements of sharing temperature and sharing current, the proportion of current and temperature can be changed in the external controller 110 to achieve reducing thermal stress of sharing current, sharing temperature or both sharing current and sharing temperature.

While various embodiments of the invention have been particularly shown and described, it will be understood by those skilled in the art that various changes in form and details may be made therein without departing from the scope of the invention as defined by the appended claims.

What is claimed is:

1. A switched-mode power supply for use as one of a set of parallel-connected switched-mode power supplies having respective outputs connected together to provide power to a load, comprising:

power circuitry operative to generate output power at an output, the output power including an output voltage and an output current;

monitoring circuitry operative to monitor both output current and operating temperature of the switched-mode power supply; and control circuitry operative to auto-tune the output voltage of the switched-mode power supply using two-dimensional control, the two-dimensional control employing a predetermined two-dimensional function of the output current and the operating temperature to vary a duty cycle of operation of the switched-mode power supply to achieve the auto-tuning of the output voltage, the two-dimensional function being a sharing function whose use in each of the set of parallel-connected switched-mode power supplies effects a coordinated sharing of the load current and operating temperature across the set of parallel-connected switched-mode power supplies, wherein the predetermined two-dimensional function is decomposable into respective one-dimensional functions for output voltage versus load current and output voltage versus operating temperature, the one-dimensional functions including respective unequal weights for the sharing of load current and the sharing of operating temperature as reflected in unequal values for a first variation of the output voltage across a full operating range of load current and a second variation of the output voltage across a full operating range of operating temperature.

2. A switched-mode power supply according to claim 1, wherein a first one-dimensional function for output voltage versus operating temperature has varying slope increasing from a first slope at a low end of the operating range of operating temperature to a second slope at a high end of the operating range of operating temperature.

3. A switched-mode power supply according to claim 2, wherein a second one-dimensional function for output voltage versus output current has varying slope decreasing from a third slope at a low end of the operating range of operating current to a fourth slope at a high end of the operating range of output current.

4. A switched-mode power supply according to claim 1, wherein the one-dimensional functions have a relative slope difference varying across the operating range of either or both the output current and operating temperature.

5. A switched-mode power supply according to claim 4, wherein the slope difference varies from a first slope difference reflecting stronger contribution of output current at a low end of the operating range of the operating temperature to a second slope difference reflecting a stronger contribution of operating temperature at a high end of the operating range of operating temperature.

6. A switched-mode power supply according to claim 1, wherein the sharing function is a droop sharing function by which the output voltage is decreased for increasing values of either or both the output current and the operating temperature.

7. A switched-mode power supply according to claim 1, wherein the sharing function includes explicit signaling of output current and operating temperature among the set of parallel-connected switched-mode power supplies, and local adjustment of output current and operating temperature at each of the switched-mode power supplies of the set based on received signaled values of output current and operating temperature from others of the set.

8. A switched-mode power supply according to claim 7, wherein the explicit signaling includes use of (1) a current-sharing bus to which respective current-sharing outputs of the switched-mode power supplies are all connected, and (2) a distinct temperature-sharing bus to which respective temperature-sharing outputs of the switched-mode power supplies are all connected.

9. A switched-mode power supply according to claim 8, wherein the connections to the temperature-sharing bus effect a summation providing an indication of an average temperature across the set of switched-mode power supplies.

10. A switched-mode power supply according to claim 8, wherein the connections to the temperature-sharing bus effect a master-slave scheme providing an indication of a highest temperature across the set of switched-mode power supplies.

11. A switched-mode power supply according to claim 7, wherein the explicit signaling includes use of communication links among the set of switch-mode power supplies.

12. A switched-mode power supply according to claim 7, wherein the explicit signaling includes use of respective communications links between the switched-mode power supplies and a separate controller that (1) receives respective signaled values from the switched-mode power supplies, and (2) forwards the respective signaled values received from the switched-mode power supplies to others of the switched-mode power supplies.

13. A method of operating a switched-mode power supply of a set of parallel-connected switched-mode power supplies having respective outputs connected together to provide power to a load, comprising:

monitoring both output current and operating temperature of the switched-mode power supply; and auto-tuning an output voltage of the switched-mode power supply using two-dimensional control, the two-dimensional control employing a predetermined two-dimensional function of the output current and the operating temperature to vary a duty cycle of operation of the switched-mode power supply to achieve the auto-tuning of the output voltage, the two-dimensional function being a sharing function whose use in each of the set of parallel-connected switched-mode power supplies effects a coordinated sharing of the load current and operating temperature across the set of parallel-connected switched-mode power supplies, wherein the predetermined two-dimensional function is decomposable into respective one-dimensional functions for output voltage versus load current and output voltage versus operating temperature, the one-dimensional functions including respective unequal weights for the sharing of load current and the sharing of operating temperature as reflected in unequal values for a first variation of the output voltage across a full operating range of operating temperature and a second variation of the output voltage across a full operating range of load current.

14. A method according to claim 13, wherein a first one-dimensional function for output voltage versus operating temperature has varying slope increasing from a first slope at a low end of the operating range of operating temperature to a second slope at a high end of the operating range of operating temperature.

15. A method according to claim 14, wherein a second one-dimensional function for output voltage versus output current has varying slope decreasing from a third slope at a low end of the operating range of operating current to a fourth slope at a high end of the operating range of output current.

16. A method according to claim 13, wherein the one-dimensional functions have a relative slope difference varying across the operating range of either or both the output current and operating temperature.

17. A method according to claim 16, wherein the slope difference varies from a first slope difference reflecting stronger contribution of output current at a low end of the operating range of the operating temperature to a second slope difference reflecting a stronger contribution of operating temperature at a high end of the operating range of operating temperature.

18. A method according to claim 13, wherein the sharing function includes explicit signaling of output current and operating temperature among the set of parallel-connected switched-mode power supplies, and local adjustment of output current and operating temperature at each of the switched-mode power supplies of the set based on received signaled values of output current and operating temperature from others of the set.

19. A method according to claim 18, wherein the explicit signaling includes use of respective communications links between the switched-mode power supplies and a separate controller that (1) receives respective signaled values from the switched-mode power supplies, and (2) forwards the respective signaled values received from the switched-mode power supplies to others of the switched-mode power supplies.

20. A method according to claim 13, wherein the sharing function is a droop sharing function by which the output voltage is decreased for increasing values of either or both the output current and the operating temperature.

* * * * *